US012048952B2

(12) United States Patent
Rooney et al.

(10) Patent No.: US 12,048,952 B2
(45) Date of Patent: Jul. 30, 2024

(54) MATERIAL WASHING APPARATUS

(71) Applicant: Terex GB Limited, Dungannon (GB)

(72) Inventors: Neil Rooney, Newry (GB); Paul McWilliams, Magherafelt (GB); Johnston Patterson, Moira (GB)

( * ) Notice: Subject to any disclaimer, the term of this patent is extended or adjusted under 35 U.S.C. 154(b) by 551 days.

(21) Appl. No.: 17/336,691

(22) Filed: Jun. 2, 2021

(65) Prior Publication Data

US 2021/0379630 A1 Dec. 9, 2021

(30) Foreign Application Priority Data

Jun. 4, 2020 (GB) ..................................... 2008448

(51) Int. Cl.

| | |
|---|---|
| ***B08B 3/04*** | (2006.01) |
| ***B02C 18/14*** | (2006.01) |
| ***B02C 23/36*** | (2006.01) |
| ***B03B 5/48*** | (2006.01) |
| ***B08B 1/16*** | (2024.01) |
| ***B08B 1/20*** | (2024.01) |
| ***B08B 1/32*** | (2024.01) |
| ***B08B 13/00*** | (2006.01) |

(52) U.S. Cl.

CPC ............ *B08B 3/042* (2013.01); *B02C 18/142* (2013.01); *B02C 23/36* (2013.01); *B03B 5/48* (2013.01); *B08B 1/165* (2024.01); *B08B 1/20* (2024.01); *B08B 1/32* (2024.01); *B08B 13/00* (2013.01)

(58) Field of Classification Search

CPC ........ B02C 18/142; B02C 23/36; B08B 3/042
See application file for complete search history.

(56) References Cited

U.S. PATENT DOCUMENTS

| | | | |
|---|---|---|---|
| 7,690,513 | B1 | 4/2010 | Gustin |
| 2003/0155278 | A1 | 8/2003 | Mirras |

(Continued)

FOREIGN PATENT DOCUMENTS

| | | |
|---|---|---|
| CN | 204817897 U | 12/2015 |
| CN | 209985566 U | 1/2020 |

(Continued)

OTHER PUBLICATIONS

United Kingdom Search Report, dated Dec. 1, 2020, for GB patent application GB2008448.9.

(Continued)

*Primary Examiner* — Jacob S. Scott
*Assistant Examiner* — Miraj T. Patel
(74) *Attorney, Agent, or Firm* — Warner Norcross + Judd LLP

(57) ABSTRACT

A washing apparatus comprises a tank in which rotatable, bladed shafts are located. The tank has a closable lower outlet located at a first end of the tank, and an upper outlet located at the first end of the tank, the upper outlet being higher than the lower outlet. A further outlet is located at a second end or between the first and second ends. The tank is disposed at an inclined angle such that the first end of the tank is lower than the second end of the tank, and is movable between a first inclined state in which the inclined angle is relatively shallow, and a second inclined state in which the inclined angle is relatively steep. The apparatus is able to perform the tasks of either a log washer or coarse material washer depending on the angle of inclination.

19 Claims, 12 Drawing Sheets

(56) References Cited

U.S. PATENT DOCUMENTS

| | | | | |
|---|---|---|---|---|
| 2016/0030983 | A1* | 2/2016 | Nordlund | B08B 3/10<br>134/104.4 |
| 2017/0282190 | A1* | 10/2017 | Ivanoff | B07B 1/28 |
| 2020/0070178 | A1* | 3/2020 | Heron | B03B 5/40 |

FOREIGN PATENT DOCUMENTS

| | | | |
|---|---|---|---|
| EP | 3225312 | A1 | 3/2017 |
| EP | 3257594 | A1 | 6/2017 |
| EP | 3584012 | A1 | 6/2019 |

OTHER PUBLICATIONS

European Search Report, dated Dec. 7, 2021, for EP patent application EP21177253.

* cited by examiner

MATERIAL WASHING APPARATUS

FIELD OF THE INVENTION

This invention relates to material washing apparatus. The invention relates particularly to apparatus for washing aggregate material.

BACKGROUND TO THE INVENTION

Washing apparatus for scrubbing aggregate to liberate conglomerates are common in the market place, as are apparatus that use a water bath and high pressure water injection to wash conglomerates off aggregates. Scrubbing apparatus are commonly referred to as 'log washers', and water bath apparatus are commonly referred to as 'coarse material washers'.

Log washers typically operate at a relatively shallow angle and contain a relatively low level of water. They utilize two interconnected shafts with blades that force aggregates to scrape of each other, and this scrubbing action, or attrition releases organic material which was bound to the stone. The organic material is encouraged to the sides of the apparatus by the rotation of the shafts, and rivers of water catch the organics and wash them out of the machine for further processing.

Coarse material washers operate at a steeper angle and have a relatively high level of water. They utilize two independent screws to convey material from the feed end to the discharge end of the apparatus. During conveying, high pressure water jets blast the material to remove conglomerates. These fines particles are released into the high water bath, where they naturally float to the top and can be removed.

Log washers are effective at releasing clays, silts, and fine particles of sand, but due to the low level of water, they are not suited to releasing other light particles, such as paper, cardboard, and ash. Coarse material washers are well suited for releasing such light materials, but are less effective with material such as clays and silts that have a density which does not allow them to naturally float to the top. Also, due to the independent nature of the coarse material washer's shafts, it does not create attrition. Accordingly, if a user needs to wash a variety of different types of material, they require both types of washing apparatus described above. Not only is this financially expensive, but it is also costly in terms of the land required, the requirement for auxiliary equipment such as feeders and conveyors, water demands, electrical costs and general maintenance.

It would be desirable to mitigate the problems outlined above.

SUMMARY OF THE INVENTION

From a first aspect the invention provides a washing apparatus comprising: a tank, the tank having a first end and a second end opposite the first end, at least one closable lower outlet located at the first end of the tank, at least one upper outlet located at said first end of said tank, said at least one upper outlet being higher than said at least one lower outlet, and at least one other outlet located at said second end or between said first and second ends; first and second rotatable shafts extending between said first and second ends the tank, at least one blade being provided on each shaft; drive means coupled to the first and second shafts for rotating each shaft about its longitudinal axis, wherein said tank is disposed at an inclined angle such that the first end of the tank is lower than the second end of the tank, and wherein said tank is movable between a first inclined state in which said inclined angle is relatively shallow, and a second inclined state in which said inclined angle is relatively steep.

In preferred embodiments, the apparatus includes means for moving said tank between said first and second inclined states. Said moving means preferably comprises one or more actuator, preferably one or more powered actuator, and/or one or more jack or other lifting device.

The apparatus may include a support structure, the tank being supported by said support structure at said inclined angle and being movable with respect to said support structure between said first and second inclined states. Said moving means may be coupled between said washing apparatus and said support structure for moving said washing apparatus between said first and second inclined states.

In preferred embodiments, in said first inclined state said inclined angle is 10° to horizontal. In preferred embodiments, in said second inclined state said inclined angle is 16° to horizontal.

Preferably, said at least one blade of the first shaft interleaves with said at least one blade of the second shaft.

Preferably, said at least one blade of each of said first and second shafts includes at least one conveying blade arranged to convey material in a direction towards said second end of the tank upon rotation of the respective shaft.

Preferably, said at least one blade of each of said first and second shafts includes at least one cutting blade having side edges that project radially outwards from the respective shaft.

In preferred embodiments, each shaft has at least one set of conveying blades alternately located along the respective shaft with at least one set of cutting blades.

Preferably, said at least one conveying blade of said first shaft is substantially aligned with said at least one conveying blade of said second shaft, and said at least one cutting blade of said first shaft is substantially aligned with said at least one cutting blade of said second shaft in the longitudinal direction, and preferably being overlapping in the transverse direction.

Optionally, an extendable conduit is connected between said at least one other outlet and said support structure.

Preferably, said at least one upper outlet comprises a weir. Said at least one upper outlet may comprise a rim at the first end of the tank.

Preferably, the or each lower outlet comprises at least one aperture formed in said first end of the tank. The, or each, lower outlet may comprise an aperture, the apparatus further including means for adjusting the height of said aperture with respect to the base of the tank. Said height-adjusting means may comprise at least one plate or other cover for partially blocking said aperture. Preferably, the or each lower outlet comprises a height-adjustable weir.

Preferred apparatus embodying the invention are able to perform the tasks of either a log washer or coarse material washer depending on the mode of operation. Advantageously, the apparatus has a relatively small footprint and can quickly switch between modes of operation using powered, e.g. hydraulic, angle adjustment means. Advantageously, two discharge options are provided: low level for log washing, and high level for coarse material washing. Moreover, the ability to operate in the two main modes allows the option of combining the main function(s) of each mode, for example combining the scrubbing action of a log washer with the high water level of a coarse material washer to float out contaminates.

From another aspect, the invention provides a washing system that includes the washing apparatus of the first aspect of the invention.

Further advantageous aspects of the invention will become apparent from review of the following description of embodiments of the invention and with reference to the accompanying drawings.

BRIEF DESCRIPTION OF THE DRAWINGS

Embodiments of the invention are now described by way of example and with reference to the accompanying drawings in which like numerals are used to denote like parts and in which.

DETAILED DESCRIPTION OF THE DRAWINGS

Referring now in particular to FIGS. 1 to 8 of the drawings there is shown, generally indicated as 10, a washing apparatus embodying one aspect of the invention. The apparatus 10 is particularly suited for use in washing aggregate material, for example comprising rocks, stones, gravel, building material, rubble, slag, clay, silt, earth, paper, cardboard, ash, sand and/or soil, or any other material, especially but not exclusively, material that is quarried, mined, excavated or which requires recycling.

Figure 5:
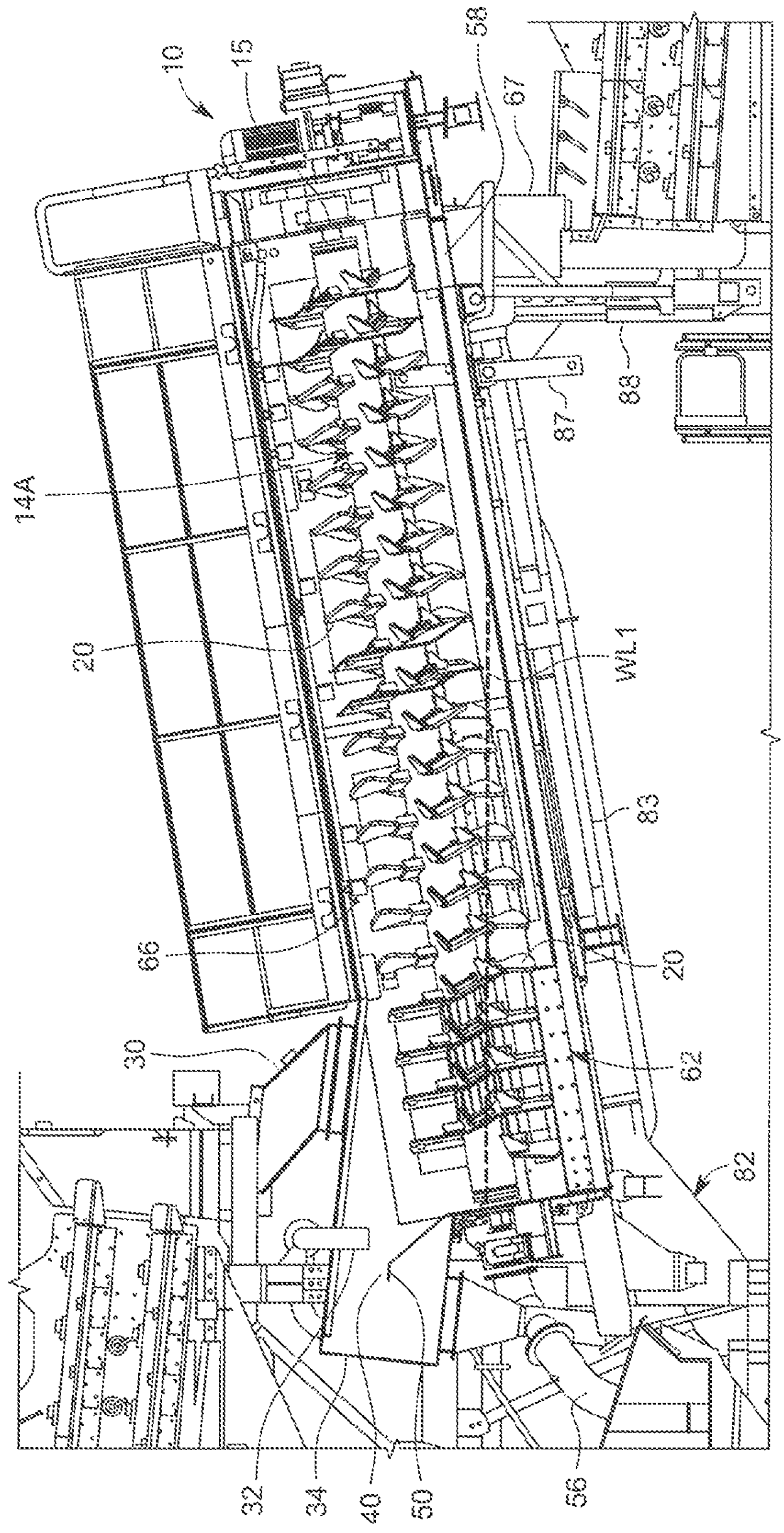
FIG. 5 is a cut-away side view of the washing apparatus of FIG. 1 configured for the first mode of use, and of part of the washing system.
Figure 6:
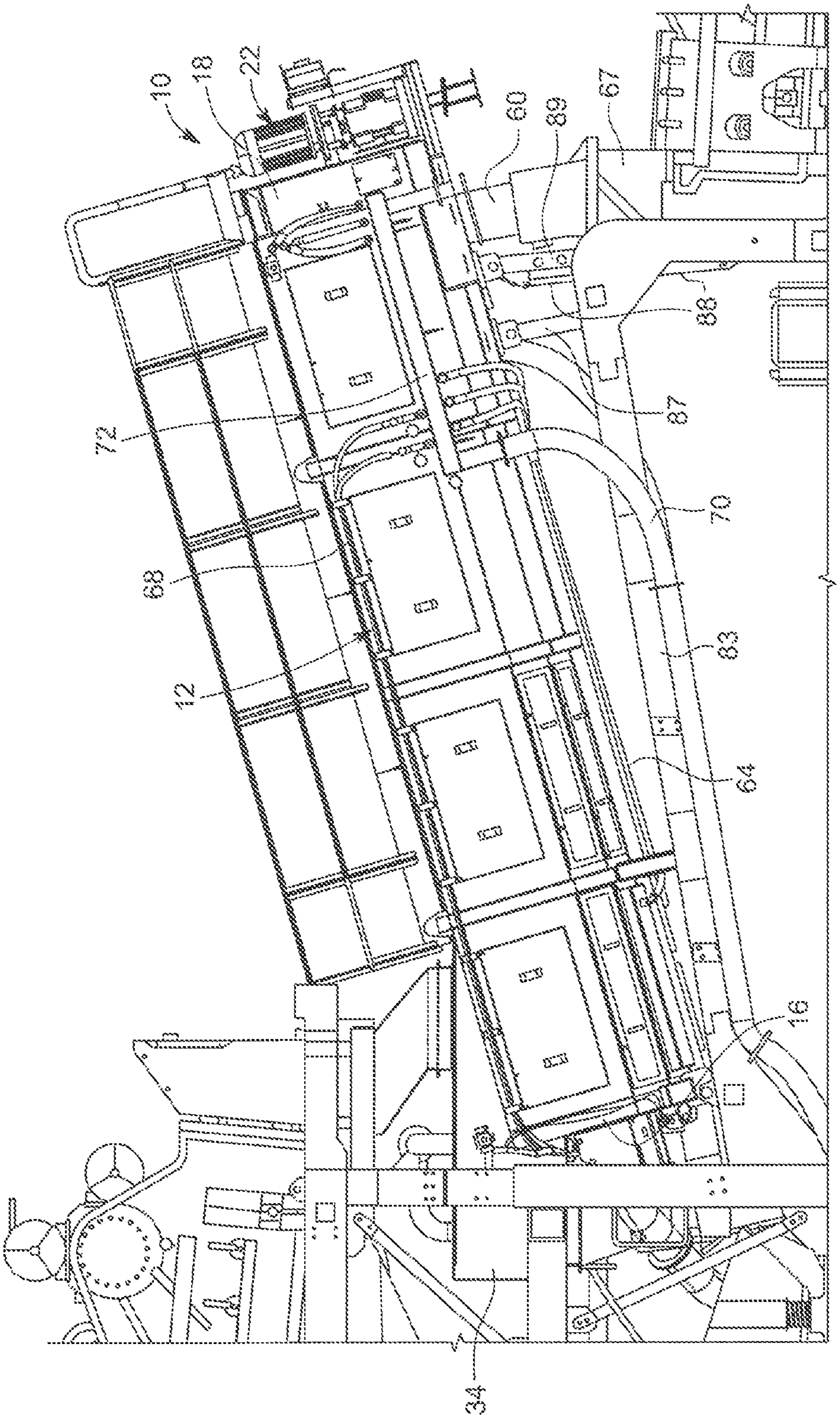
FIG. 6 is a side view of the washing apparatus of FIG. 1 configured for a second mode of use, and of part of the washing system.
Figure 7:
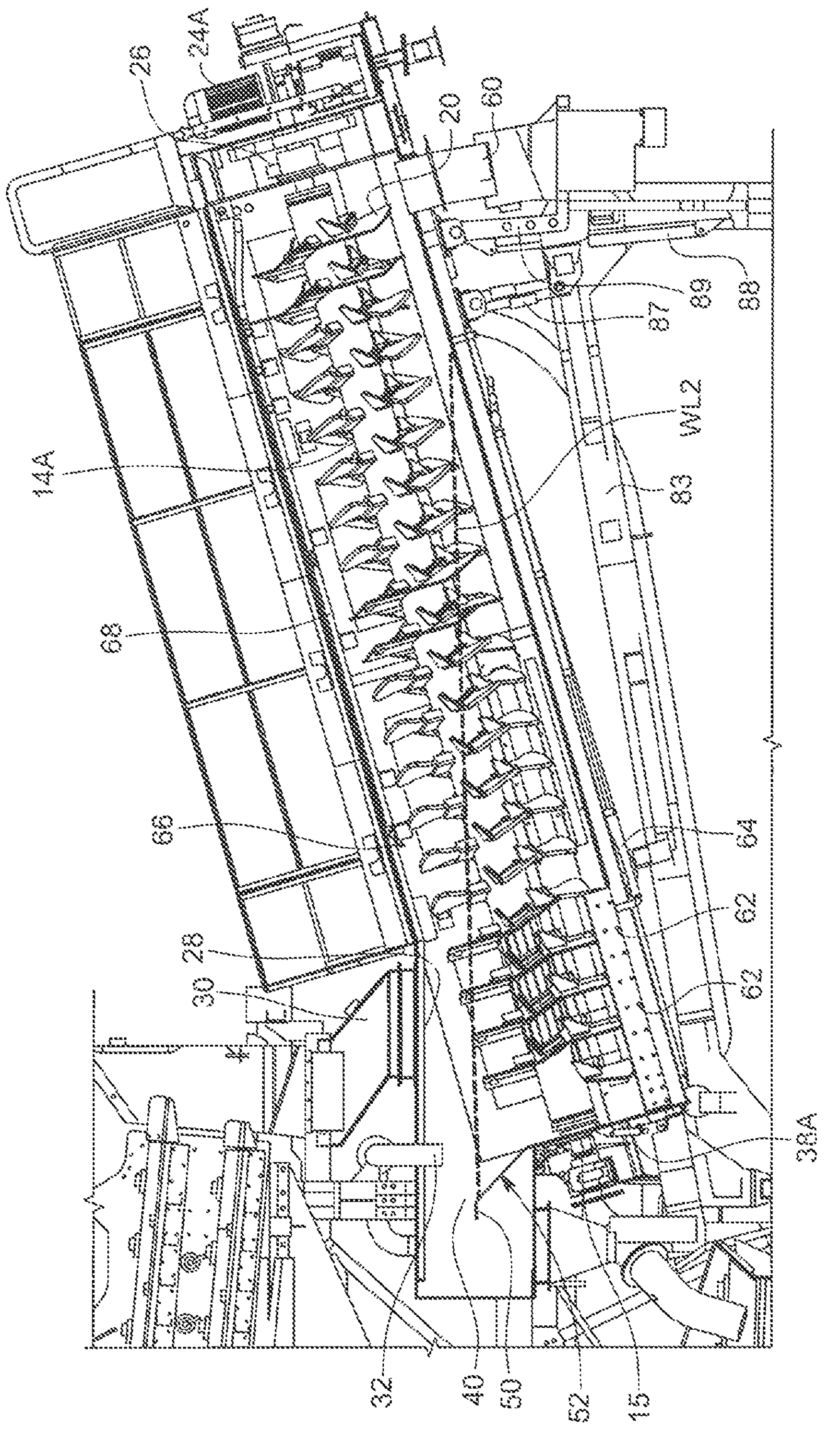
FIG. 7 is a cut-away side view of the washing apparatus of FIG. 1 configured for a second mode of use, and of part of the washing system.
Figure 8:
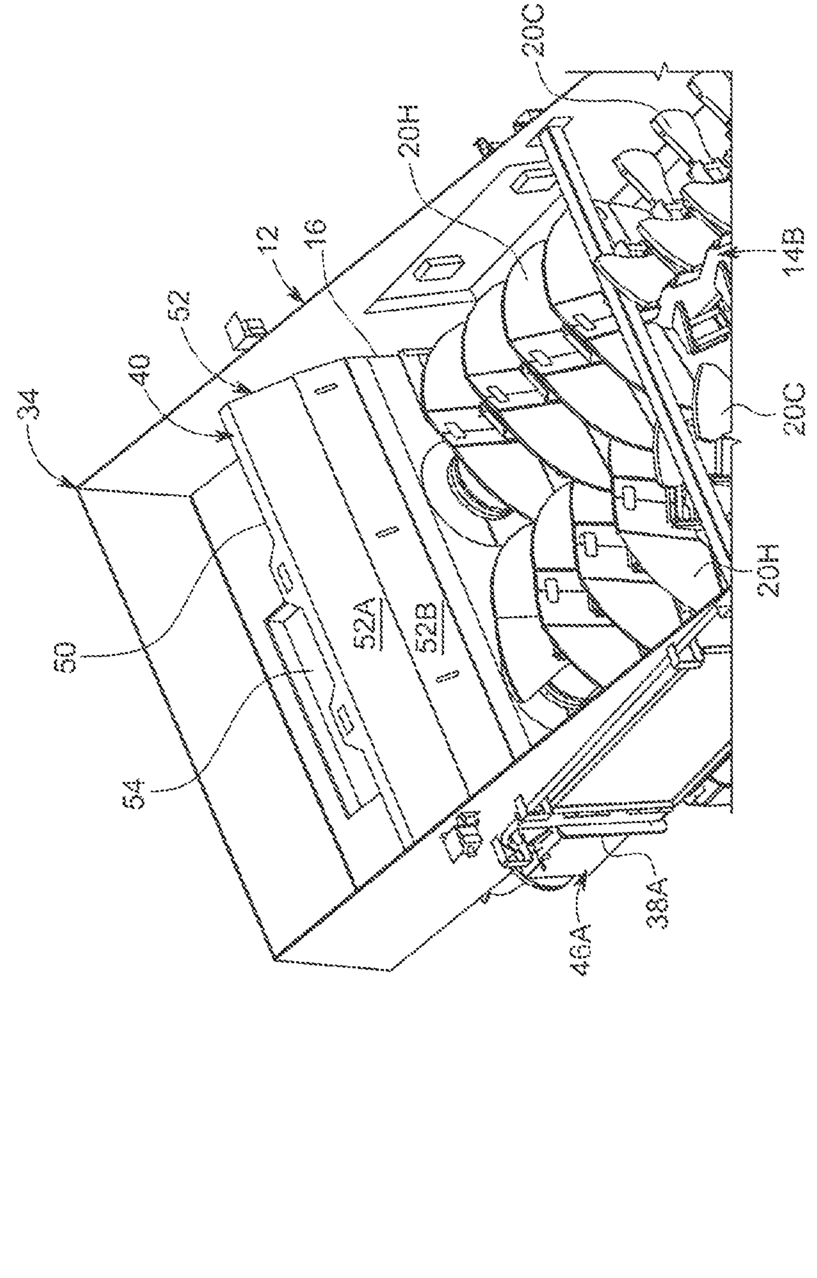
FIG. 8 is a perspective view of a first end of the apparatus of FIG. 1.
Figure 9:
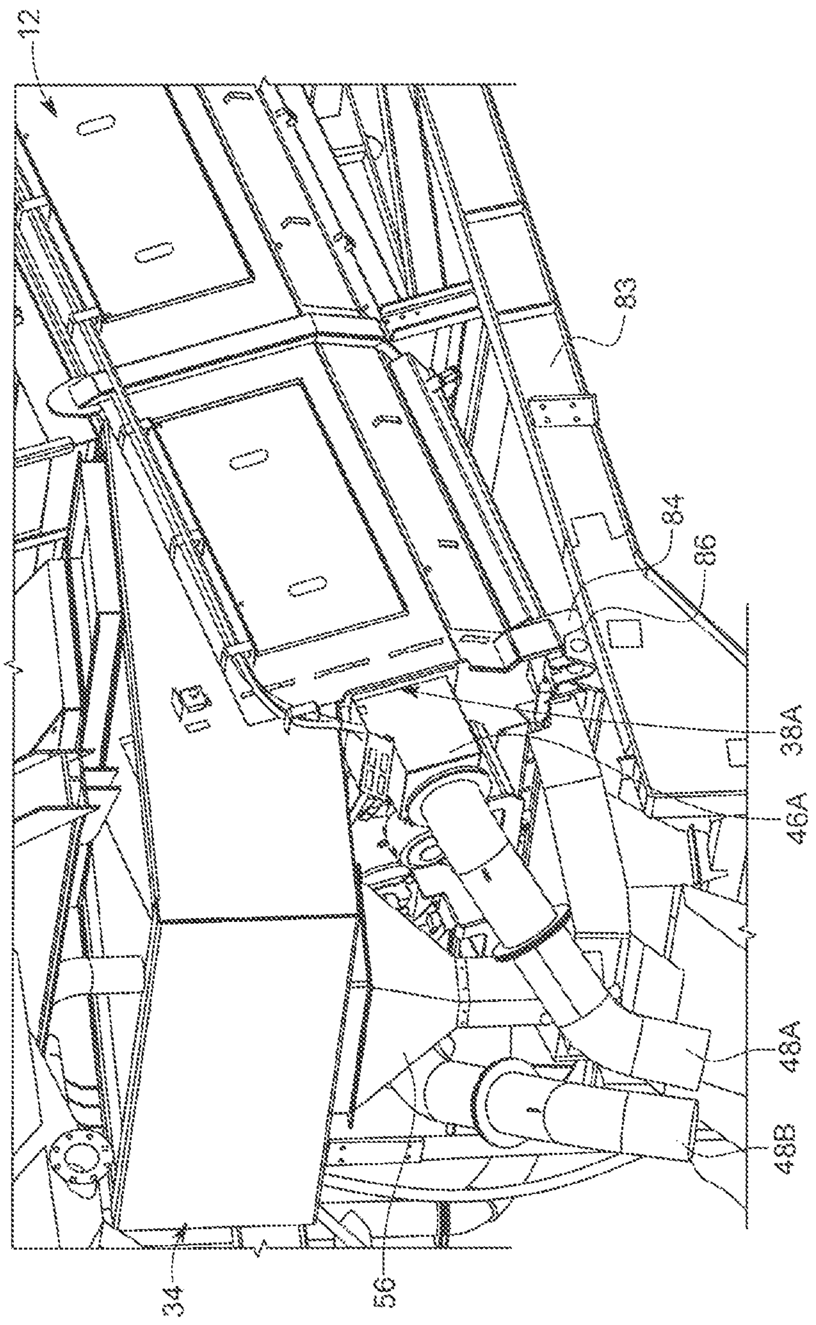
FIG. 9 is another perspective view of the first end of the washing apparatus of FIG. 1.

The apparatus 10 comprises a tank 12 for receiving material (not shown) to be washed and liquid, typically water, used in the washing process. In FIGS. 5 and 6, the working water level in the tank 12 is shown by broken lines WL1 and WL2 respectively.

First and second rotatable shafts 14A, 14B (FIG. 8) are located in the tank 12, extending between first and second ends 16, 18 of the tank 12. The shafts 14A, 14B are typically disposed parallel with each other. The shafts 14A, 14B preferably extend parallel, or along, the longitudinal axis of the tank 12 (i.e. the end-to-end direction of the tank 12). The shafts 14A, 14B are spaced apart from each other in a lateral direction, and are preferably located at the same, or substantially the same, height within the tank 12, i.e. are located side-by-side. The shafts 14A, 14B are rotatable about their respective longitudinal axis with respect to the tank 12. To this end, the shafts 14A, 14B may be mounted in bearings 15 provided at or adjacent the ends 16, 18 of the tank 12. In alternative embodiments, there may be a single shaft 14, or more than two shafts 14.

Blades 20 project laterally from each shaft 14A, 14B, at least some of which are arranged in a helical manner around and along the respective shaft 14A, 14B such that each shaft 14A, 14B acts as a conveying auger when rotating about its longitudinal axis. In preferred embodiments, each shaft 14A, 14B has at least one set of helically arranged blades 20H. The, or each, set of helical blades 20H may comprise a plurality of spaced-apart blades 20H longitudinally spaced apart along a respective section of the respective shaft and arranged in a helical manner, or a single helical blade extending around and along the respective section of the shaft. The blades 20H may be annular, or disc-like, extending around the circumference of the respective shaft 14A, 14B. The blades 20H may helically shaped and/or may be collectively arranged in a helical manner. In preferred embodiments, each shaft 14A, 14B has more than one set of helically arranged blades 20H, each set being spaced apart along the length of the respective shaft 14A, 14B. It is preferred that each shaft has a set of helically arranged blades 20H located at the end 16 of the tank 12. Each shaft may have another set of helically arranged blades 20H located at the end 18 of the tank 12. In the illustrated embodiment, each shaft has a third set of helically arranged blades 20H located between the ends 16, 18, e.g. mid-way along the tank 12. In any event, the arrangement is such that, upon rotation of the shafts 14A, 14B, material in the tank 12 is conveyed by the blades 20H towards the second end 18 of the tank 12.

In preferred embodiments, each shaft 14A, 14B has at least one set of cutting blades 20C. The, or each, set of cutting blades 20C may comprise a plurality of blades 20C that are circumferentially and longitudinally spaced apart around a section of the respective shaft 14A, 14B. Each blade 20C is shaped and dimensioned so that it extends only partly around the circumference of the shaft, i.e. it is paddle-like rather than disc-like, and may for example be approximately square, rectangular or polygonal in shape. As such, each blade 20C has side edges that project radially outwardly from the respective shaft 14A, 14B, as well as an end edge. The preferred shape of the blades 20C facilitates cutting material and creating attrition.

In preferred embodiments, the set(s) of helically arranged blades 20H alternate with the set(s) of cutting blades 20C in the longitudinal direction of each shaft 14A, 14B. Preferably, the arrangement is such that each set of helically arranged blades 20H on one shaft 14A are longitudinally aligned with a set of helically arranged blades on the other shaft 14B, and each set of cutting blades 20C on one shaft 14A are longitudinally aligned with a set of cutting blades 20C on the other shaft 14B. The alignment is such that the blades 20H, 20C of one shaft are able to interleave with the blades 20H, 20C of the other shaft.

The shafts 14A, 14B are configured such that the blades 20 of one shaft 14A, 14B are interleaved with the blades 20 of the other shaft 14B, 14A. As such the interleaved blades overlap in the transverse direction. During use, the interleaved blades 20 have a scrubbing or attritional effect on the material in the tank 12, which aids the washing process. The interleaving of the blades 20 may be achieved by suitable arrangement of the spacing between the shafts 14A, 14B and the size and longitudinal position of the blades 20 on the respective shafts 14A, 14B. In preferred embodiments, the arrangement is such that interleaved blades are spaced apart from each other in the longitudinal direction by a distance that is twice the maximum particle size for which the apparatus 10 is intended to wash.

A drive system 22 is provided for rotating the shafts 14A, 14B about their respective longitudinal axis. The drive system 22 may take any conventional form, typically comprising at least one motor 24A, 24B, e.g. an electric motor or a hydraulic motor, coupled to the shafts 14A, 14B. Each motor 24A, 24B may be coupled to the respective shaft 14A, 14B by a drivetrain 26, which may take any suitable conventional form. Typically, a respective motor 24A, 24B is provided for each shaft, although in alternative embodiments the same motor may be coupled to each shaft 14A, 14B by any suitable drivetrain. In typical embodiments the shafts 14A, 14B are driven in the same rotational direction, although they may be driven in opposite directions. Preferably, the drive system 22 is configured to rotate each shaft 14A, 14B at the same frequency or speed. In preferred embodiments, the shafts are mechanically interlinked with each other by one or more cog wheel (not shown) or other suitable interlinking mechanism. The preferred arrangement is such that the shafts 14A, 14B rotate together with constant phase, or timing, in order to maintain a constant spacing between interleaved blades.

Figure 1:
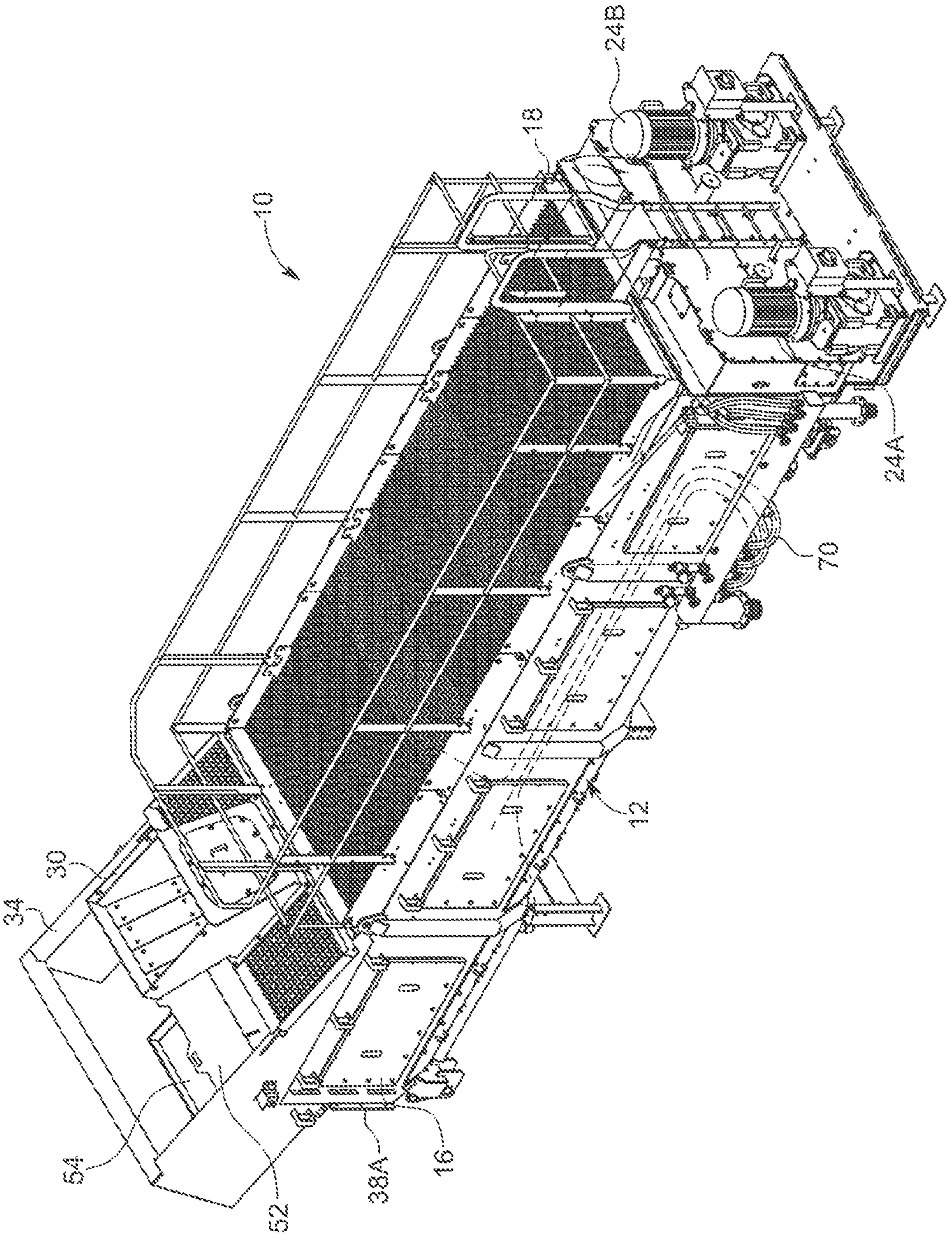
FIG. 1 is a perspective view of a washing apparatus embodying one aspect of the invention.
Figure 2:
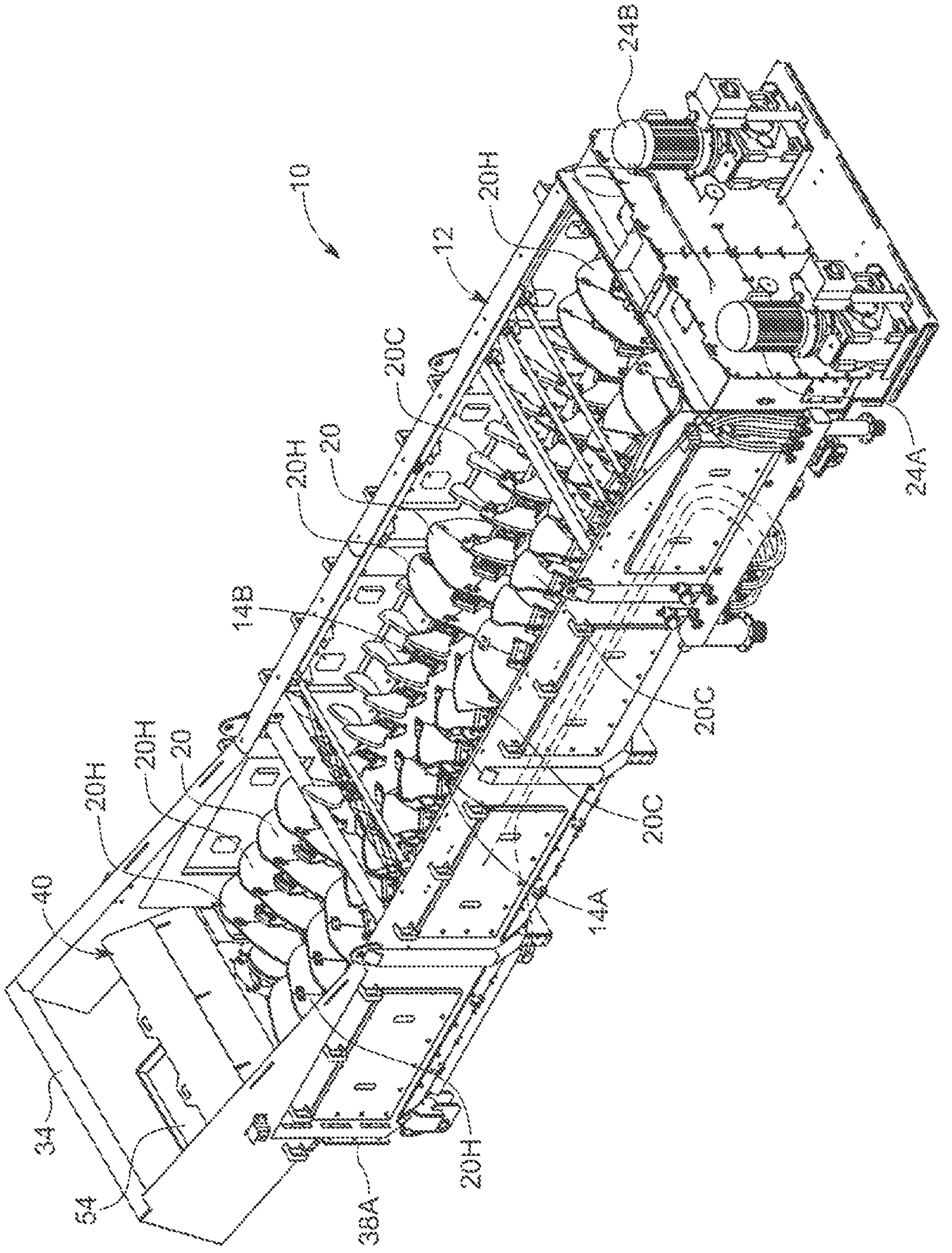
FIG. 2 is a perspective view of the apparatus of FIG. 1 with upper components removed to show the inside of the apparatus.
Figure 3:
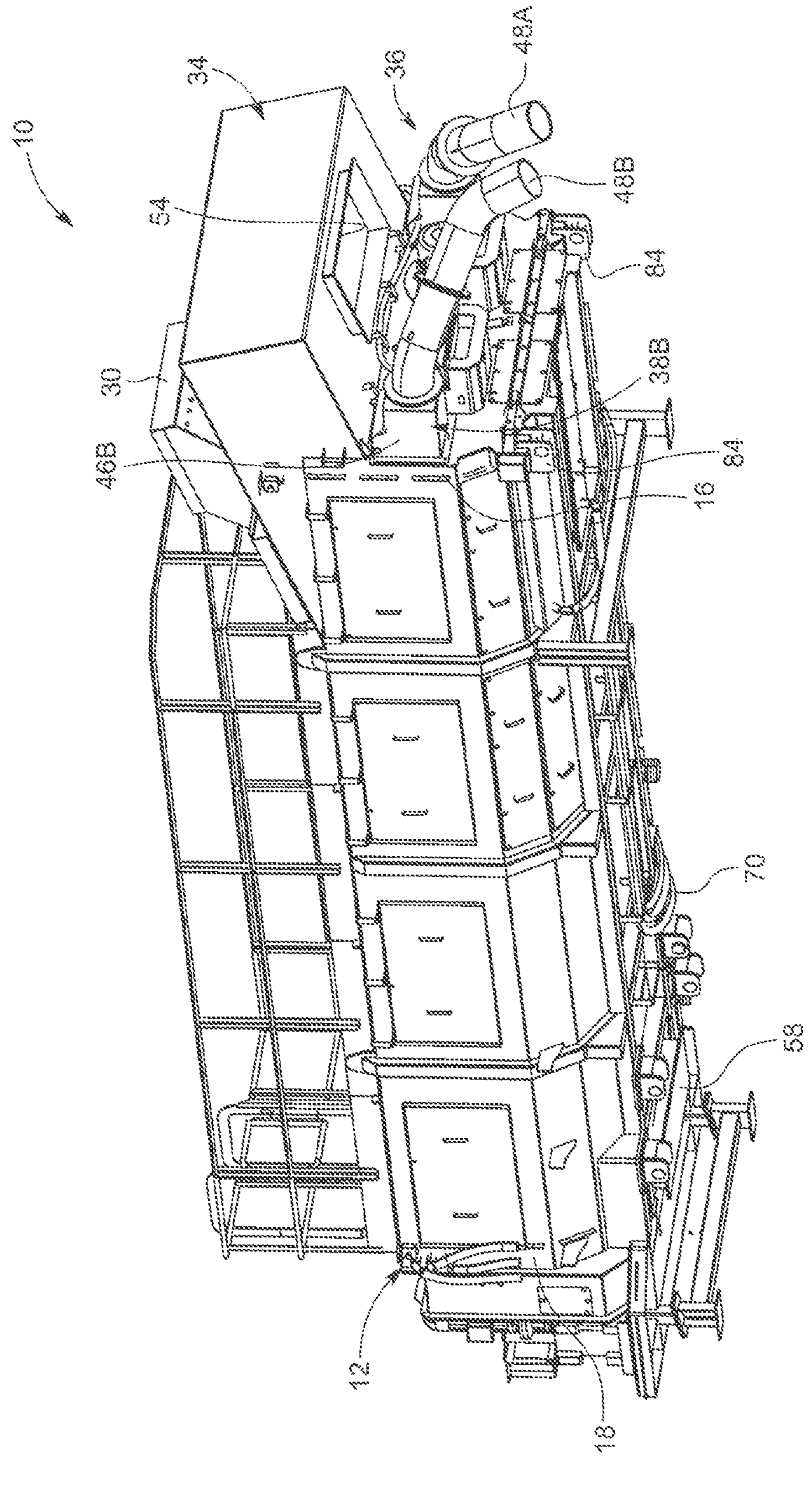
FIG. 3 is an alternative perspective view of the washing apparatus of FIG. 1.

The tank 12 includes an inlet 28 for receiving material to be washed, the inlet 28 preferably being located at the first end 16 of the tank 12. It is also preferred that the inlet 28 is located at the top of the tank 12 so that the material can be fed to the apparatus 10 from above. In preferred embodiments, the inlet 28 comprises a chute 30. The inlet 28 may be facilitated by leaving the tank open at its top, at least at the first end 16. The chute 30 may feed material into the tank 12 via the open top, or may be omitted. As can be seen in FIG. 1, a grille 29, or other suitable structure, may be provided on top of the tank 12 to serve as a walkway and to prevent accidental contact with the components in the tank 12. The grille 29 is preferably removable, as shown in FIG. 2.

The tank 12 includes at least one inlet for feeding water into the tank. Conveniently, this may be facilitated by making the tank open at its top, at least at the first end 16. In the illustrated embodiment, a pipe 32 is located over the open top of end 16 for feeding water into the tank 12. Preferred embodiments include other water inlets as is described in more detail below.

An end support structure 34 may be provided at the end 16 of the tank 12 for supporting the chute 30 and receiving the pipe 32. The end support structure 34 may also serve as part of an outlet system for material that has been separated from the aggregate, as is described in more detail below.

An outlet system 36 is provided at the end 16 of the tank 12. The outlet system 36 allows material that has been separated from the aggregate during the washing process to exit the tank 12. The separated material removed via the outlet system 36 is typically regarded as waste material. The outlet system 36 comprises at least one first outlet 38A, 38B and at least one second outlet 40. The first outlet(s) 38A, 38B are spaced apart from the second outlet(s) 40 in the top-to-bottom direction of the tank 12, in particular such that the first outlet(s) 38A, 38B are located below the second outlet(s) 40.

Figure 10:
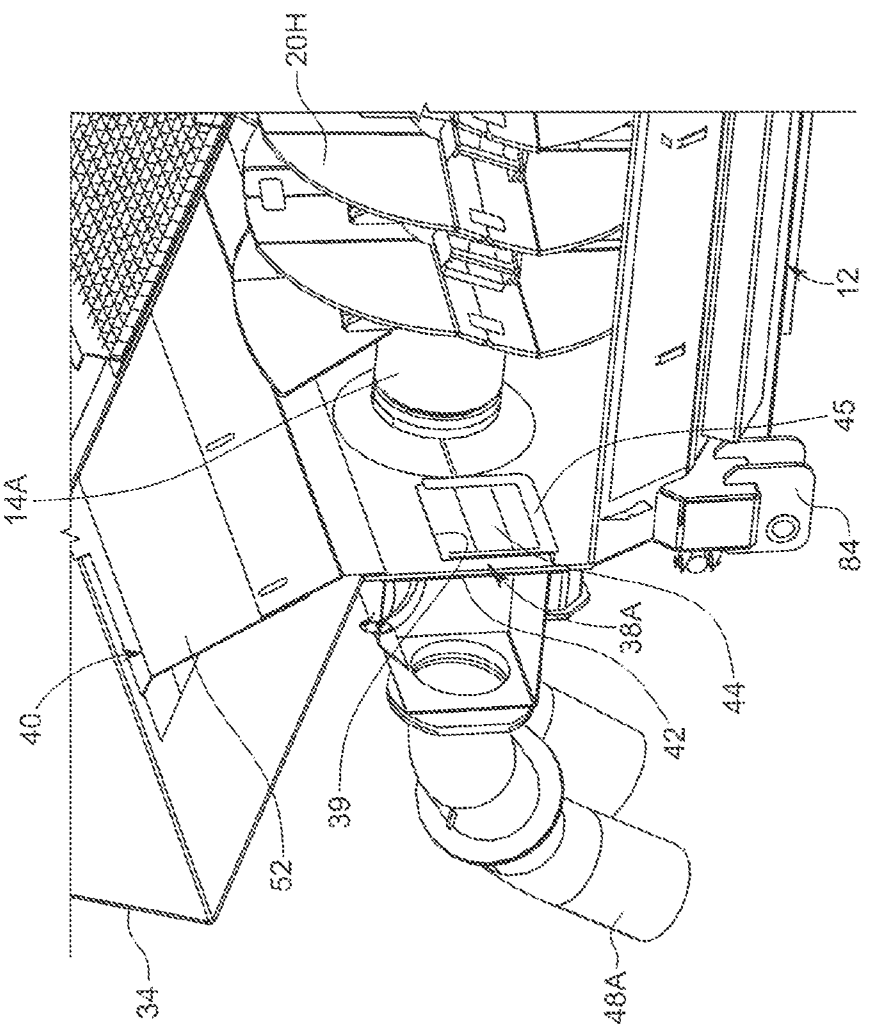
FIG. 10 is a cut-away view of the first end of the washing apparatus of FIG. 1.

In the illustrated embodiment, there are two laterally spaced apart first, or lower, outlets 38A, 38B. In alternative embodiments there may be only one first outlet, or more than two. Each lower outlet 38A, 38B may be open or closed depending on the mode of operation of the apparatus 10. As is described in more detail hereinafter, in a first mode of operation each lower outlet 38A, 38B is open, and in a second mode of operation each lower outlet 38A, 38B is closed. The lower outlet(s) 38A, 38B may be closed by any convenient closure means, for example by means of a removable plate 42 or other removable cover (FIG. 10). Preferably, the height (with respect to the base of the tank 12) of the aperture 39 that is provided when each outlet 38A, 38B is open is adjustable. Adjusting the height of the aperture 39 allows the water level in the tank 12 to be controlled. This may be achieved using any convenient means, for example a height-adjustable weir 44 that covers part of the aperture 39. The aperture 39 may be formed in the end wall of the tank 12. The weir 44 may be located inside or outside of the tank 12 as is convenient. By way of example, the weir 44 may comprise one or more plates which may be held against the aperture 39 by a corresponding holding structure(s) 45. Weir plates of different sizes may be used to make the weir 44 height-adjustable. Alternatively, multiple weir plates may be stacked on top of each other to adjust the height of the weir and therefore of the aperture 39.

In preferred embodiments, each lower outlet 38A, 38B feeds into an outlet port 46A, 46B located externally of the tank 12. In the illustrated embodiment, a respective outlet port 46A, 46B is provided for each outlet 38, but in alternative embodiments each lower outlet 38A, 38B may feed into a common outlet port. The, or each, outlet port 46A, 46B may be connected to, or connectable to, an outlet conduit 48A, 48B.

In preferred embodiments, the second, or upper, outlet 40 is defined by an upper rim 50 provided at the end 16 of the tank 12. In the illustrated embodiment, there is a single upper outlet 40 defined by the rim 50 running across the entire width of the end 16 of the tank 12. Preferably, a weir 52, for example comprising a plate or other suitable structure, is provided at the top of end 16 and provides the rim 50. The weir 52 may extend obliquely outwards from the end wall of the tank 12. The weir 52 is preferably adjustable in order to adjust the height of the rim 50. For example, the weir 52 may comprise a plate 52A or other barrier structure that is extendable/retractable with respect to a base 52B whereby the degree of extension/retraction determines the height of the rim 50. Alternatively, the weir 52 may be pivotably coupled to the end 16 of the tank 12 to allow the height of the rim 50 to be adjusted. In alternative embodiments, there may be more than one upper outlet 40, for example being defined by laterally spaced rim portions or weirs, or by apertures that are the same as or similar to those which provide the lower outlets 38A, 38B. Alternatively still, the or each upper outlet may be the same as or similar to the lower outlets 38.

In preferred embodiments, the upper outlet 40 feeds into an outlet port 54 located externally of the tank 12. The outlet port 54 may be connected to, or connectable to, an outlet conduit 56. In the illustrated embodiment, the outlet port 54 is provided in the end support structure 34, which is shaped and dimensioned to extend around the upper outlet 40.

One or more closable drains or other outlets may be provided at the base and/or in the sides or ends of the tank for draining the water out of the tank 12 as required.

The tank 12 further includes at least one outlet 58 for allowing egress of washed aggregate material from the tank. In the illustrated embodiment, there is one washed material outlet 58, but in alternative embodiments there may be more than one. The outlet 58 is preferably provided at or adjacent the second end 18 of the tank, but may be located between the first and second ends. The outlet 58 is preferably located at, or adjacent, the base of the tank 12. In use, material is conveyed along the tank 12 by the action of the shafts 14A, 14B to the outlet 58, by which the washed material exits the tank 12, preferably under the influence of gravity. A conduit in the preferred form of a chute 60 (FIG. 11) is connected or connectable to the outlet 58 as is described in more detail hereinafter.

Optionally, a plurality of first nozzles 62 are provided in the tank 12. The nozzles 62 are oriented to direct water upwardly within the tank 12, and are preferably located at or adjacent the base of the tank 12 and/or at a side of the tank 12. The nozzles 62 are preferably located at least at the first end 16 of the tank 12, e.g. being distributed up to halfway along the tank although they may extend the whole way along the tank 12 from end 16 to end 18. The nozzles 62 may be arranged in one or more arrays. In preferred embodiments, a respective set of nozzles 62 is provided at each side of the tank 12, preferably at or adjacent its base. The nozzles 62 are connected to one or more conduits 64 by which pressurized water may be supplied to the nozzles 62 from an external source. In use, water emanating from the nozzles 62 creates an upward current in the water in the tank 12, which assists particulate material that has been removed from the aggregate to be suspended in the water and/or to rise to the surface of the water, thereby facilitating its movement to the outlet(s). In particular, the action of the nozzles 62 encourages particles that have been removed from the material being washed to move to the surface of the water to facilitate their removal via the outlet 40 in a second mode of operation described hereinafter.

Optionally, a plurality of second nozzles 66 are provided at the top of the tank 12, preferably arranged in an array that extends laterally across the tank 12. A nozzle support structure such as a bar may be provided across the tank 12 for supporting the nozzles 66. The nozzle support structure may comprise or carry one or more conduits for supplying water to the nozzles 66. The nozzles 66 are located between the first and second ends 16, 18 of the tank 12 and are oriented to direct water towards the first end 16. Preferably, the nozzles 66 are located above the highest water level WL2 and are oriented to direct water downwards, i.e. onto to the surface of the water in the tank 12 during use. The nozzles 66 are connected to one or more conduits 68 by which pressurized water may be supplied to the nozzles 66 from an external source. In use, water emanating from the nozzles 66 helps to move material that has gathered at or adjacent the surface of the water in the tank 12 towards the end 16 of the tank 12 and therefore towards the outlet(s), in particular the outlet 40.

In preferred embodiments, the tank 12 includes one or more liquid inlets 70 for supplying water to the nozzles 62, 66 via the respective conduits 64, 68 and conveniently also via a manifold 72. One or more pipes 74 may be connected to the inlet(s) 70 for feeding water to the inlet(s) 70 from an external source (not shown).

Figure 4:
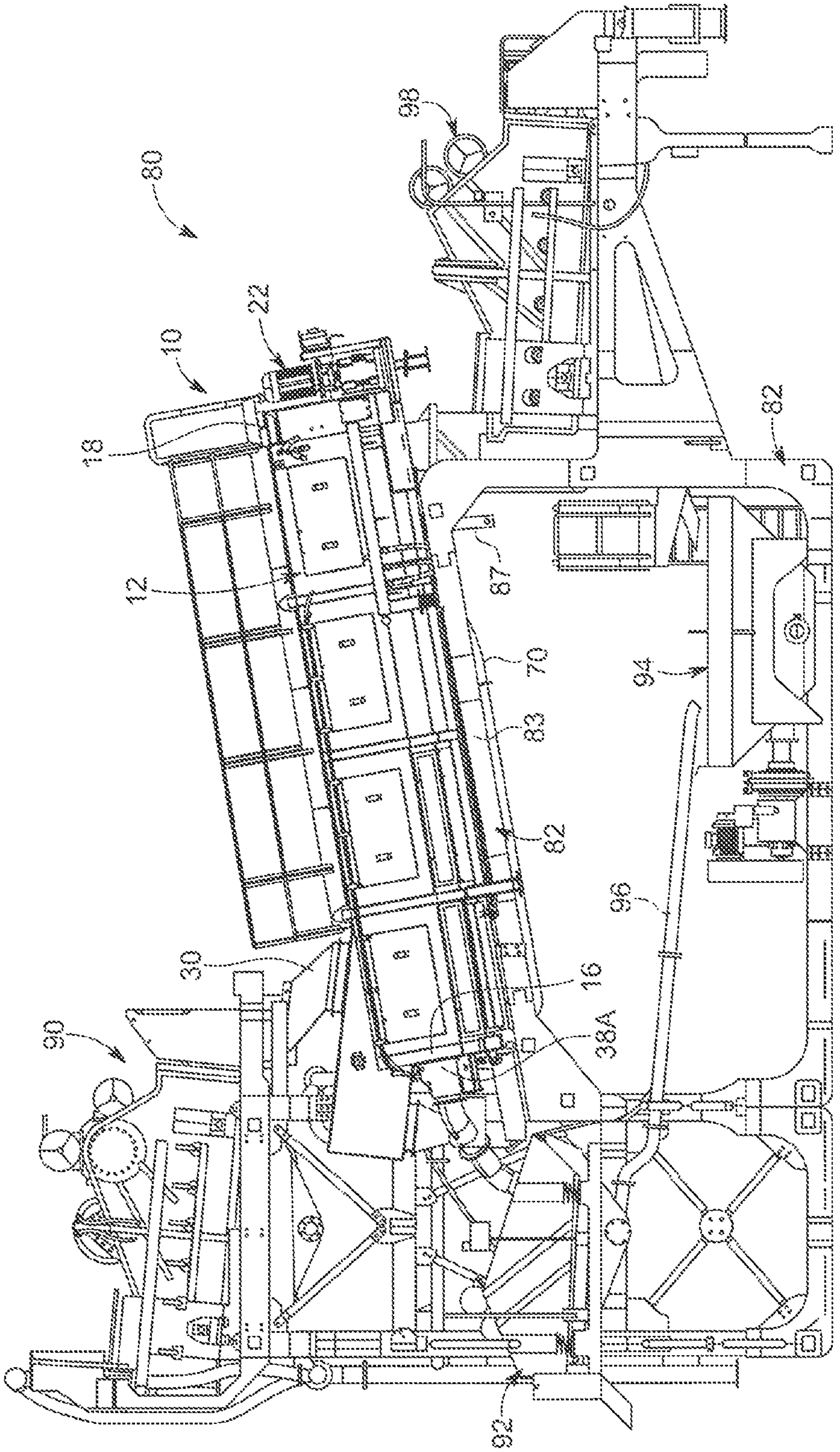
FIG. 4 is a side view of the washing apparatus of FIG. 1 incorporated into a washing system that embodies another aspect of the invention, and being configured for a first mode of use.

The washing apparatus 10 is shown incorporated into a washing system 80 (see FIG. 4 in particular). The apparatus 10 is carried by a tank support structure 82, which may be part of the apparatus 10 or part of the washing system 80 as is convenient. The tank support structure 82 may have any suitable configuration, typically comprising a framework, and is usually configured to support the washing apparatus 10 on or above a ground surface. The washing apparatus 10, in particular the tank 12, is disposed such that the first end 16 of the tank 18 is lower than the second end 18. As such, the longitudinal axis of the tank 12 is inclined with respect to horizontal. Advantageously, the angle of inclination of the longitudinal axis is adjustable. In preferred embodiments, the washing apparatus 10 is movable with respect to the tank support structure 82 between a first inclined state (FIG. 4), in which the angle of inclination is relatively shallow, and a second inclined state (FIG. 6) in which the angle of inclination is relatively steep. In particular, the angle of inclination in the first inclined state is relatively shallow in comparison with the angle of inclination in the second inclined state, and the angle of inclination in the second inclined state is relatively steep in comparison with the angle of inclination in the first inclined state. In preferred embodiments, the angle of inclination in the first inclined state is 10° with respect to horizontal. In preferred embodiments, the angle of inclination in the second inclined state is 16° with respect to horizontal. In alternative embodiments, different angles of inclination may be adopted in either one or both of the first and second inclined states. The ability to change the angle of inclination of the apparatus 10, in particular the tank 12, enables the apparatus 10 to operate in at least two different modes of operation as is described in more detail hereinafter.

In preferred embodiments, the apparatus 10 is coupled to the tank support structure 82 for pivoting movement about a horizontal axis that runs perpendicular to the longitudinal axis of the tank 12. This may be achieved in any convenient manner. Preferably, the end 11 of the apparatus 10 corresponding to end 16 of the tank 12 is pivotably coupled to the tank support structure 82. In alternative embodiments (not illustrated), the end 13 of the apparatus 10 corresponding to end 18 of the tank 12 is pivotably coupled to the tank support structure 82. The pivotable coupling may comprise any convenient conventional pivot joint(s), hinge(s) or other couplings that support pivoting movement. For example, in the illustrated embodiment, a first part 84 of a pivot coupling is provided at the end 11 (preferably one at each side of the apparatus 10) and a corresponding second part 86 is provided on the tank support structure 82, the respective first and second parts 84, 86 being pivotably coupled together by a pin (not shown).

The apparatus 10 includes means for moving, conveniently pivoting, the tank 12 to adjust its angle of inclination with respect to the tank support structure 82, or other support, e.g. the ground, on which the apparatus 10 is located. The moving means typically comprises any suitable arrangement of one or more actuators 88, preferably comprising one or more hydraulic rams although other powered actuators, preferably linear actuators, may alternatively be used. Each actuator 88 is coupled between the tank support structure 82 and the apparatus 10 and is operable to change the angle of inclination of the tank 12 as described above, conveniently by causing the apparatus 10 to pivot with respect to the tank support structure 82. In preferred embodiments, each actuator 88 is located at or adjacent the second end 13 or the apparatus 10, or otherwise between the location of the pivot joints 84, 86 and the second end 13, and is operable to pivot the apparatus 10 about the pivot joints 84, 86. Typically first and second actuators 88 are provided, one at each side of the apparatus 10. Preferably, each actuator 88 is coupled to a respective extendable support post 89 (or other extendable support structure), the support post 89 being coupled between the tank support structure 82 and the apparatus 10, extending and contracting longitudinally as the actuator 88 extends and retracts. Each support post 89, which may comprise first and second telescopically assembled posts, is preferably lockable in at least one state of extension by one or more locking pin (not shown). Optionally, one or more additional supports 87 may be coupled between the tank 12 and the tank support structure 82 to support the tank 12 when it is elevated by the actuators 88.

The actuators 88 are operable to move the apparatus 10 between the first inclined state (FIG. 4) and the second inclined state (FIG. 6). Optionally, the actuators 88 may be operated to hold the apparatus 10 in at least one other inclined state (not illustrated) between the first and second inclined states. The extendable support 89 may be lockable in a state of extension corresponding to any one or more of the inclined states.

In preferred embodiments, the apparatus 10 may rest on the tank support structure 82 when in the first inclined state. To this end the tank support structure 82 may include a bed portion 83 on which the apparatus 10 rests in the first inclined state. The bed section 83 may be inclined with respect to horizontal in order to achieve the desired inclination of the apparatus 10 in the first inclined state. In the other state(s) of inclination, the apparatus 10 may be supported by the actuator(s) 88 and support post(s) 89 as applicable.

The washing system 80 may include a feeding apparatus 90 for feeding material to be washed into the tank 12 via inlet 28. Typically, the feeding apparatus 90 is located above the washing apparatus 10 so that the material may be fed into the tank 12 under the influence of gravity. The feeding apparatus 90 has an outlet that is positioned in register with the inlet 28, in particular with the chute 30 in preferred embodiments. The chute 30 may be slidably coupled to the outlet of the feeding apparatus 90 by any convenient slide mechanism (not shown) to allow movement between the inlet of the chute and the outlet of the feeder 90 as the angle of inclination of the tank 12 changes. The feeding apparatus 90 may take any conventional form, and may for example comprise a conventional material processing unit (e.g. a screening unit) and/or any one or more of a conveyor, hopper or chute as required. The feeding apparatus 90 may be mounted on the tank support structure 82 or provided separately (e.g. on a separate support structure), depending on the application. For example, in alternative embodiments, a mobile material processing apparatus (not shown) may be positioned adjacent the apparatus 10 in order to feed material to it.

The washing system 80 may include a first material processing apparatus 92 for receiving material that exits the tank 12 via either one or both of the lower or upper outlets 38, 40. To this end, any one of or each of the outlet conduits 48A, 48B, 56 may be arranged to direct material to the first material processing apparatus 92. Conveniently, the first material processing apparatus 92 is located below the washing apparatus 10 so that material may be fed from the washing apparatus 10 to the material processing apparatus 92 under the influence of gravity. The first material processing apparatus 92 typically comprises a material screening unit, but may comprise any conventional material processing apparatus (e.g. a cyclone or other separator). The material processing apparatus 92 may be mounted on the tank support structure 82 or provided separately (e.g. on a separate support structure), depending on the application. For example, in alternative embodiments, a mobile material processing apparatus (not shown) may be positioned adjacent the apparatus 10 in order to receive the material from it.

The washing system 80 may include a second material processing apparatus 94 for receiving material that exits the tank 12 via either one or both of the lower or upper outlets 38, 40. To this end, any one of or each of the outlet conduits 48A, 48B, 56 may be arranged to direct material to the second material processing apparatus 94 directly. Alternatively or in addition, a conduit 96 may be provided for directing material from an outlet of the first material processing apparatus 92 to the second material processing apparatus 94. Conveniently, the second material processing apparatus 94 is located below the washing apparatus 10, and preferably also below the first material processing apparatus 92, so that material may be fed to it under the influence of gravity. The material processing apparatus 94, which may for example be a sump tank, may be mounted on the tank support structure 82 or provided separately (e.g. on a separate support structure), depending on the application.

The washing system 80 may include a third material processing apparatus 98 for receiving material that exits the tank 12 via the outlet 58. To this end, the chute 60 may be arranged to direct material to the third material processing apparatus 98. Conveniently, the third material processing apparatus 98 is located below the washing apparatus 10 so that material may be fed from the washing apparatus 10 to the material processing apparatus 98 under the influence of gravity. The third material processing apparatus 98 typically comprises a material screening unit, but may comprise any conventional material processing apparatus (e.g. a cyclone or other separator). The material processing apparatus 98 may be mounted on the tank support structure 82 or provided separately (e.g. on a separate support structure), depending on the application. For example, in alternative embodiments, a mobile material processing apparatus (not shown) may be positioned adjacent the apparatus 10 in order to receive the material from it.

Figure 11:
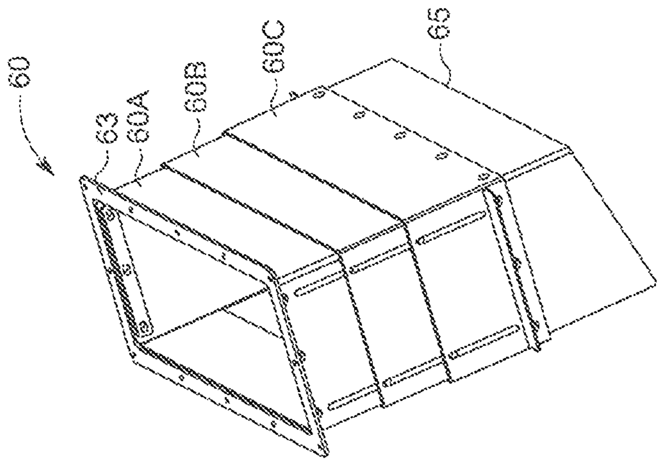
FIG. 11 is a perspective view of an adjustable chute for use with the washing apparatus of FIG. 1.

Referring in particular to FIG. 11, a preferred embodiment of the chute 60 is shown. The preferred chute 60 is extendable in length so that it may accommodate the movement of the apparatus 10 between the first and second inclined states. To this end, the chute 60 may comprise a plurality of telescopically assembled chute sections 60A, 60B, 60C coupled together in any convenient manner (e.g. slots 61 and pins (not shown) to allow them to telescopically extend and retract. Alternatively, the chute 60 may be extendable in any other manner, e.g. by means of concertinaed body. In preferred embodiments, one end 63 of the chute 60 is connected to the outlet 58 and the other end 65 is connected to the tank support structure 82. The end 65 may be positioned to feed material directly or indirectly into the third material processing apparatus 98. For example, the end 65 may be connected to an intermediate chute 67 provided on the tank support structure 82, the intermediate chute 67 being positioned to feed material to the third material processing apparatus 98.

Figure 12:
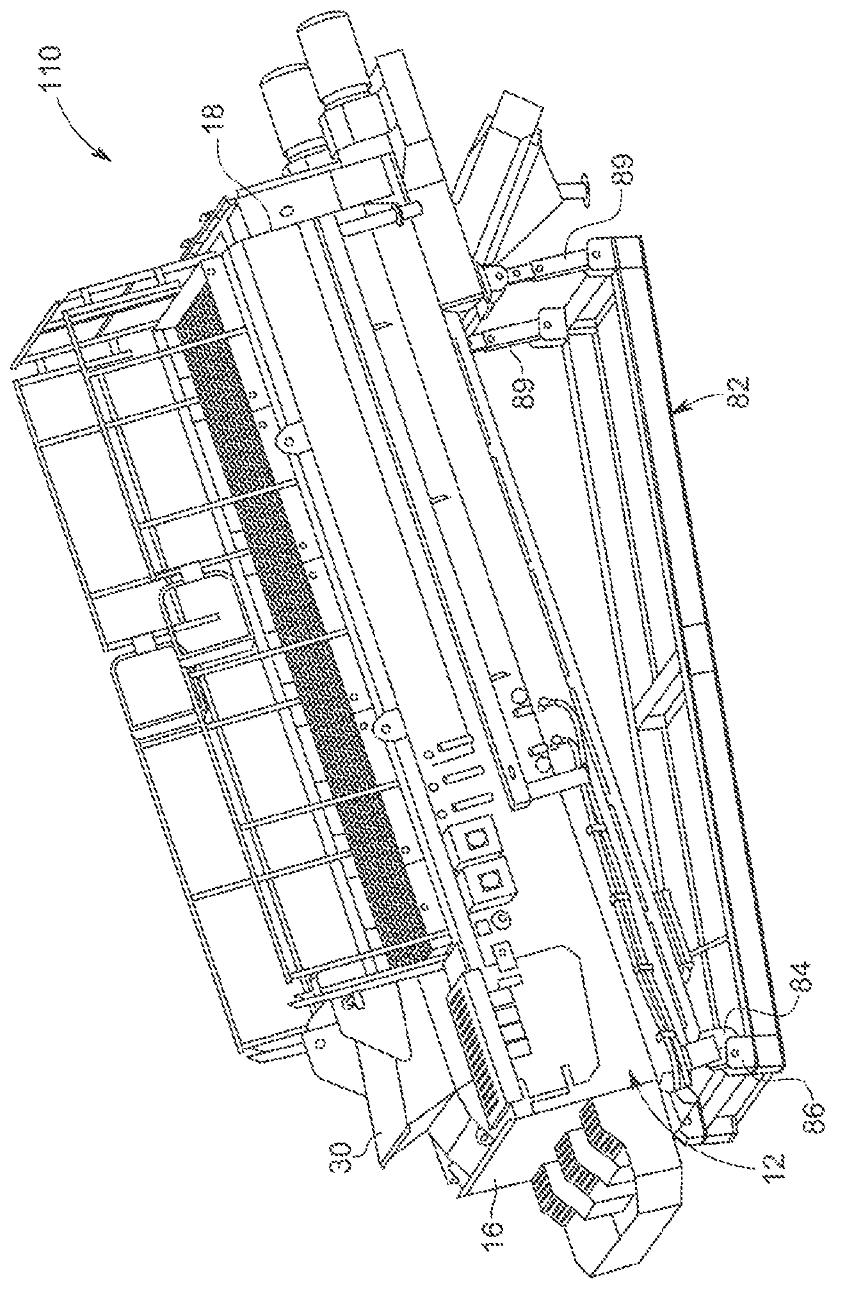
FIG. 12 is a perspective view of an alternative washing apparatus embodying the invention.

FIG. 12 shows an alternative embodiment of the washing apparatus, generally indicated as 110. The apparatus 110 may be the same, or similar, to the apparatus 10 and the same or similar description applies unless otherwise indicated as would be apparent to a skilled person. The apparatus 110 is not incorporated into the system 80 but may be used with one or more feeding apparatus and other material processing apparatus as required. The apparatus 110 includes a tank support structure 82 and the tank 12 is pivotably coupled to the tank support structure 82 to allow the angle of inclination of the tank 12 to be adjusted as described above. Extendable supports 89 are coupled between the tank 12 and the tank support structure 82 for holding the tank 12 at different angles of inclination. One or more powered actuators (not shown) are preferably provided for moving the tank 12 with respect to the tank support structure 82, as described above. In any embodiment, one or more jacks or other conventional lifting device(s) may be used to move the tank 12 with respect to the tank support structure 82 instead of or as well as the actuators 88.

In a first mode of operation the washing apparatus 10, 110 is in the first inclined state (FIGS. 4 and 5) and the lower outlets 38A, 38B are open. The tank 12 is provided with water to the relatively low level WL1, or more generally to a level that matches the level of the aperture 39 of outlets 38A, 38B. As such material that has been removed from the aggregate material and is floating on or adjacent the water surface, or is suspended in the water near the surface, may exit the tank 12 via the lower outlets 38. This removal of material may be assisted by the action of water emanating from either one or both sets of nozzles 62, 66.

The height of the aperture 39 of the lower outlets 38A, 38B may be adjusted to correspond to the desired water level using the weir 44. This allows different water levels to be used, which facilitates different types of washing. In addition, the adjustable weir 44 facilitates use of the apparatus 10 in other modes in which the apparatus 10, 110 is disposed at other angles of inclination that are between the first (lowest) and second (highest) angles wherein the desired water level may be above or below WL1 depending on the type of washing to be performed.

In a second mode of operation the washing apparatus 10, 110 is in the second inclined state (FIGS. 6 and 7) and the lower outlets 38A, 38B are closed. The tank 12 may be provided with water to the highest water level WL2, or more generally to a level that matches the level, or rim, of the upper outlet 40. As such material that has been removed from the aggregate material and is floating on or adjacent the water surface, or is suspended in the water near the surface, may exit the tank 12 via the upper outlet 40. This removal of material may be assisted by the action of water emanating from either one or both sets of nozzles 62, 66.

In any mode of operation, the desired water level in the tank 12 may be maintained by water injected via either one or both sets of nozzles 62, 66, or any other water inlet(s) as is convenient In all modes, the washed material is conveyed along the tank 12 towards the second end 18 by the shafts 14A, 14B and exits the tank 12 via outlet 58. In the first mode of operation, the chute 60 is in a relatively retracted state to match the relatively low inclination of the tank 12. In the second mode of operation, the chute 60 is in a relatively extended state to match the relatively high inclination of the tank 12. In other modes, the chute 60 may be intermediately extended to match the angle of inclination of the tank 12.

The preferred apparatus 10, 110 is able to perform the tasks of either a log washer or coarse material washer depending on the mode of operation. Advantageously, the apparatus 10 has a relatively small footprint and can quickly switch between modes of operation using the actuators 88. The lower or upper outlets may be used depending on the mode of operation, for example the lower outlets 38A, 38B are for log washing, and the upper outlet 40 is used for coarse material washing. Moreover, the ability to operate in the first or second modes allows the option of combining the main function(s) of each mode, for example combining the scrubbing action of a log washer with the high water level of a coarse material washer to float out contaminates.

The invention is not limited to the embodiment(s) described herein but can be amended or modified without departing from the scope of the present invention.

The invention claimed is:

1. A washing apparatus comprising:

a tank, the tank having a first end and a second end opposite the first end, at least one closable lower outlet located at the first end of the tank, at least one upper outlet located at said first end of said tank, said at least one upper outlet being higher than said at least one lower outlet, and at least one other outlet located at said second end or between said first and second ends;

first and second rotatable shafts extending between said first and second ends of the tank, at least one blade being provided on each shaft;

drive system coupled to the first and second shafts for rotating each shaft about its longitudinal axis, wherein said tank is disposed at an inclined angle such that the first end of the tank is lower than the second end of the tank, and wherein said tank is movable between a first inclined state and a second inclined state, wherein in said first inclined state said inclined angle is relatively shallow in comparison with said inclined angle when the tank is in said second inclined state, and wherein said apparatus is operable in either one of: a first mode of operation or a second mode of operation, and wherein in said first mode of operation said tank is in said first inclined state and said at least one lower outlet is open, and in said second mode of operation said tank is in said second inclined state, said at least one lower outlet is closed, and water is provided in said tank to a level that matches the level of said at least one upper outlet.

2. The washing apparatus of claim 1, further including moving means for moving said tank between said first and second inclined states.

3. The washing apparatus of claim 2, wherein said moving means comprises one or more actuator, preferably one or more powered actuator, and/or one or more jack or other lifting device.

4. The washing apparatus of claim 1, further including a tank support structure, the tank being supported by said tank support structure at said inclined angle and being movable with respect to said tank support structure between said first and second inclined states.

5. The washing apparatus of claim 4, further including moving means for moving said tank between said first and second inclined states, wherein said moving means is coupled between said washing apparatus and said tank support structure for moving said washing apparatus between said first and second inclined states.

6. The washing apparatus of claim 1, wherein in said first inclined state said inclined angle is 10° to horizontal.

7. The washing apparatus of claim 1, wherein in said second inclined state said inclined angle is 16° to horizontal.

8. The washing apparatus of claim 1, wherein said at least one blade of the first shaft interleaves with said at least one blade of the second shaft.

9. The apparatus of claim 1, wherein said at least one blade of each of said first and second shafts includes at least one conveying blade arranged to convey material in a direction towards said second end of the tank upon rotation of the respective shaft.

10. The apparatus of claim 1, wherein said at least one blade of each of said first and second shafts includes at least one cutting blade having side edges that project radially outwards from the respective shaft.

11. The apparatus of claim 10, wherein said at least one blade of each of said first and second shafts includes at least one conveying blade arranged to convey material in a direction towards said second end of the tank upon rotation of the respective shaft, and wherein each shaft has at least one set of conveying blades alternately located along the respective shaft with at least one set of cutting blades.

12. The apparatus of claim 10 wherein said at least one blade of each of said first and second shafts includes at least one conveying blade arranged to convey material in a direction towards said second end of the tank upon rotation of the respective shaft, and wherein said at least one conveying blade of said first shaft is substantially aligned with said at least one conveying blade of said second shaft, and said at least one cutting blade of said first shaft is substantially aligned with said at least one cutting blade of said second shaft in the longitudinal direction, and preferably being overlapping in the transverse direction.

13. The washing apparatus of claim 4, wherein an extendable conduit is connected between said at least one other outlet and said tank support structure.

14. The washing apparatus of claim 1, wherein said at least one upper outlet comprises a weir.

15. The washing apparatus of claim 1, wherein said at least one upper outlet comprises a rim at the first end of the tank.

16. The washing apparatus of claim 1, wherein said at least one lower outlet comprises at least one aperture formed in said first end of the tank.

17. The washing apparatus of claim 1, wherein said at least one lower outlet comprises a height-adjustable weir.

18. A washing apparatus comprising:

a tank, the tank having a first end and a second end opposite the first end, at least one closable lower outlet located at the first end of the tank, at least one upper outlet located at said first end of said tank, said at least one upper outlet being higher than said at least one lower outlet, and at least one other outlet located at said second end or between said first and second ends;

first and second rotatable shafts extending between said first and second ends the tank, at least one blade being provided on each shaft;

a drive system coupled to the first and second shafts for rotating each shaft about its longitudinal axis, wherein said tank is disposed at an inclined angle such that the first end of the tank is lower than the second end of the tank, and wherein said tank is movable between a first inclined state and a second inclined state, wherein in said first inclined state said inclined angle is relatively shallow in comparison with said inclined angle when the tank is in said second inclined state, wherein said at least one lower outlet comprises at least one aperture formed in said first end of the tank and wherein the, or each, lower outlet comprises an aperture, the apparatus further including height-adjusting means for adjusting the height of said aperture with respect to the base of the tank.

19. The washing apparatus of claim 18, wherein said height-adjusting means comprises at least one plate or other cover for partially blocking said aperture.

* * * * *